Aug. 24, 1948.   W. C. BAUER   2,447,680
FILTERING SYSTEM
Original Filed Jan. 28, 1942   3 Sheets-Sheet 1
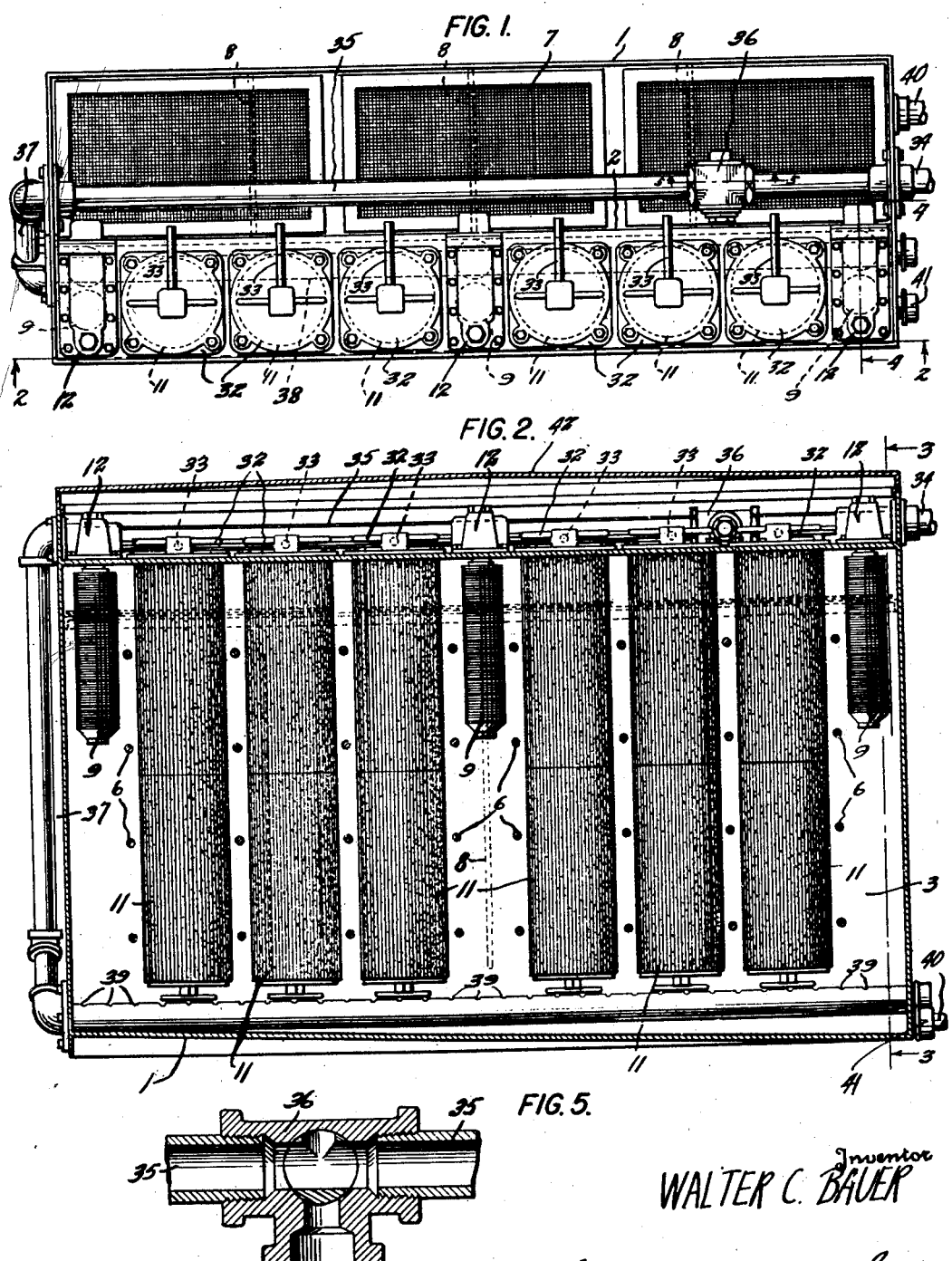

Aug. 24, 1948.  W. C. BAUER  2,447,680
FILTERING SYSTEM
Original Filed Jan. 28, 1942  3 Sheets-Sheet 2
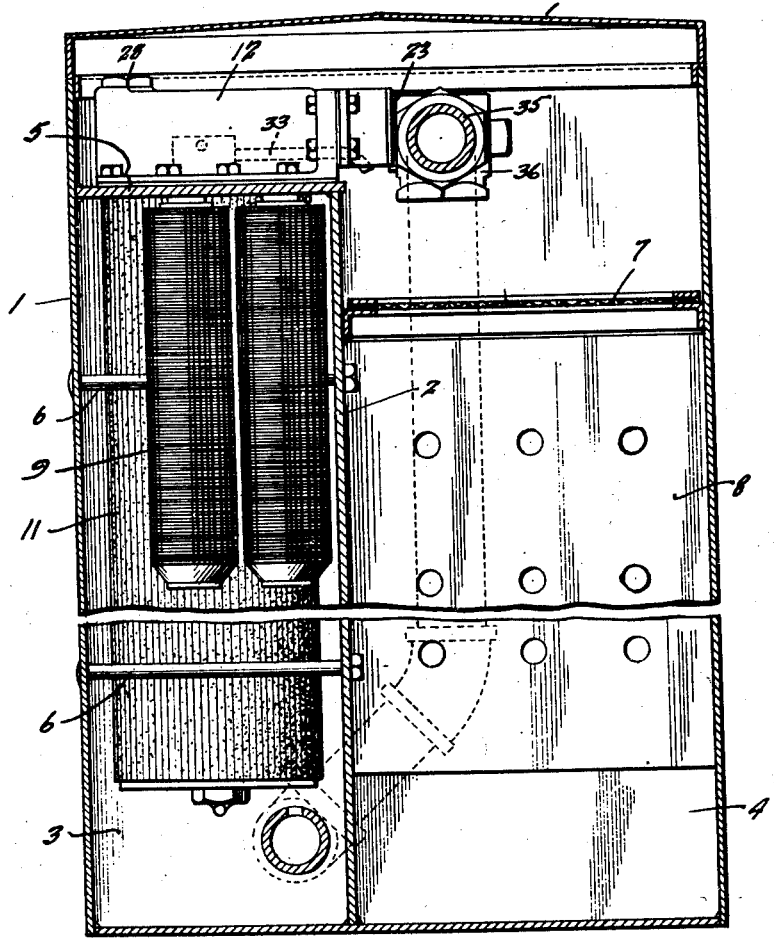
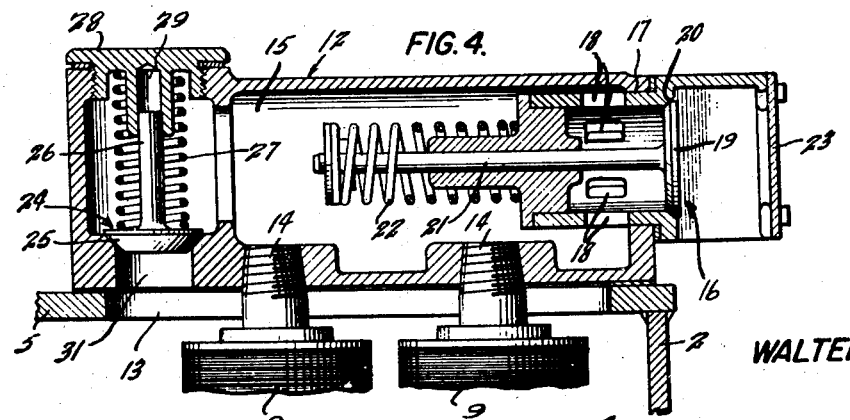
Inventor
WALTER C. BAUER Aug. 24, 1948.  W. C. BAUER  2,447,680
FILTERING SYSTEM
Original Filed Jan. 28, 1942  3 Sheets-Sheet 3
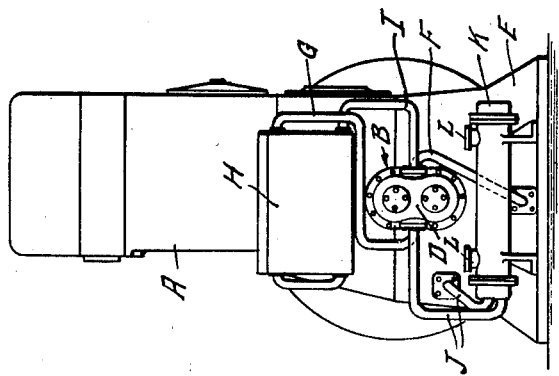
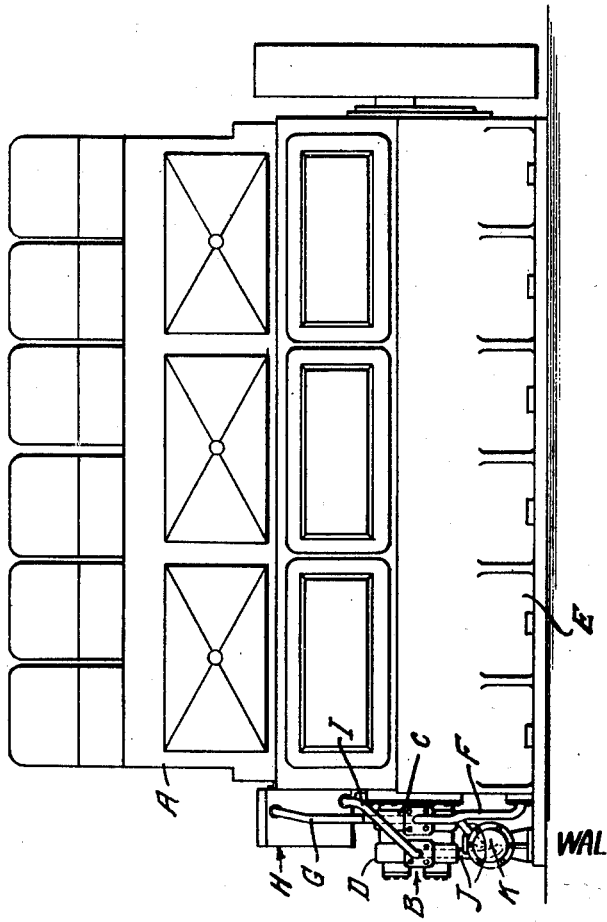
Inventor
WALTER C. BAUER
By Semmes, Keegin, Beale & Semmes
Attorneys Patented Aug. 24, 1948

2,447,680

UNITED STATES PATENT OFFICE 2,447,680

FILTERING SYSTEM

Walter C. Bauer, Chevy Chase, Md., assignor, by mesne assignments, to The Briggs Filtration Company, Bethesda, Md., a corporation of Maryland Original application January 28, 1942, Serial No. 428,590. Divided and this application June 21, 1943, Serial No. 491,696

3 Claims. (Cl. 210—184)

This invention relates to a fluid purification system, and more particularly to a system for purifying the lubricating oil for an engine provided with a dry-sump crankcase and a separate oil storage tank.

This application is a division of my co-pending application Serial No. 428,590, filed January 28, 1942 which has become abandoned, which is a continuation-in-part of my application Serial No. 259,026, filed February 28, 1939 which has also become abandoned.

Heretofore clarification systems for engines having a dry-sump crankcase have usually had the filters positioned on the pressure side of a pressure pump. This presents certain disadvantages inasmuch as it has necessitated a relatively heavy construction for the filter, and also increases the possibilities of leakage and injury to the purification system, thus tending to impair the general efficiency of the apparatus. Also, in event of failure of the purifying apparatus, oil pressure to the engine is cut off and the engine may be seriously injured.

Likewise the prior systems have usually provided the filtering elements separate from the storage tank and also from each other. Obviously such arrangements necessitate an unnecessary amount of line connections, and here again the construction in general must be heavier than is necessary in the system which is the subject of this application. Likewise, special precautions must be taken in the case of such prior systems to avoid leakage.

Furthermore, the previous systems, in general, have provided no adequate means for by-passing the clarification system when it is necessary to make replacements or repairs to the same, and the prior systems have been especially deficient in providing by-passing which will serve to filter the oil even while it is being by-passed around the primary filtering system.

An object of this invention is to provide a purification system which will overcome the above mentioned disadvantages and other disadvantages inhering in the systems of the prior art.

Another object of this invention is to provide a clarifier system which may be positioned on the suction side of the pressure pump and the pressure side of a scavenger pump of a dry-sump crankcase motor.

Yet another object of this invention is to provide an oil clarifier unit in which the filtering elements are located within the oil storage tank of a lubricating system for a dry-sump crankcase motor.

Still another object of my invention is to provide an oil clarifier unit composed of a plurality of filtering elements in which the operation of each individual element or group of elements may be readily determined.

A still further object of this invention is to provide an oil purifying system in which provision is made for readily by-passing the system when desired, and particularly where means are provided for filtering the oil when so by-passed.

With these and other objects in view, my invention in general embraces the concept of providing a purification system which may be positioned intermediate between the scavenger and pressure pumps in the lubrication system for an engine of the dry-sump crankcase type. I preferably position the filtering device within the oil storage tank found in the lubricating system for this type of engine. It will be appreciated that the oil in such tank is under substantially atmospheric pressure.

It is usually desirable to provide filters of different capacities—that is, designed to remove foreign matter of different sizes from the oil and in such case the several different filters may be arranged in series or in parallel. In the preferred form of my invention, means are provided for visually observing the operation of the individual elements or group of elements so that it can be readily determined when any one, or group, of such elements needs replacing or repairing.

In the accompanying drawings showing two specific embodiments of my inventive concept, and in which corresponding numerals refer to the same parts:

Figure 1 is a top plan view, with the cover removed, of a clarifying system provided with full flow strainers and filtering elements arranged in parallel.

Figure 2 is a longitudinal sectional view of the device shown in Figure 1, taken along the line 2—2 of Figure 1.

Figure 3 is a cross sectional view taken along the line 3—3 of Figure 2.

Figure 4 is a detailed view of the discharge end, and associated valve arrangement, of the full flow strainers, taken along the line 4—4 of Figure 1.

Figure 5 is a detailed view of the by-pass valve taken along the line 5—5 of Figure 1.

Figure 6 is a side elevational view of a motor upon which is mounted the oil clarifier.

Figure 7 is an end view of the structure shown in Figure 12.

In order to illustrate the invention there is disclosed in Figures 6 and 7 of the drawings, a Diesel motor generally designated by the letter A, which is operatively connected by a suitable mechanism to a pump unit, generally designated by the letter B. The pump unit B consists of a scavenger pump C and a pressure pump D.

The crankcase E of the engine is connected to the scavenger pump C by means of a conduit F through which oil is withdrawn from the base of the engine by the action of the scavenger pump C and forced through a conduit G into an oil purifier, generally designated H which forms the basis of this invention.

After the oil has been purified in the unit H, in a manner which will subsequently be described it is drawn through an outlet conduit I into the suction side of the pressure pump D and is then forced through a conduit J which connects the pressure side of the pump to the crankcase E.

Interposed in the conduit J is a cooler K. The oil in returning to the engine is cooled while passing through the cooler by coming into heat exchange contact with water circulated through the cooler by means connected to the nipples. These means are not shown.

Referring to the form of purifier device H set forth in Figures 1–5, there is provided a casing or oil storage tank, designated generally by the numeral 1. This tank is divided longitudinally by a wall 2 terminating short of the top of the tank and which forms, in effect, a filtering compartment 3 and an oil reservoir 4 within the tank. The filtering compartment is provided with a top 5 which is suitably apertured to receive the necessary fittings which support the filtering elements and when the fittings are secured in place, serves to maintain the filtering compartment separate and distinct from the oil reservoir 4, even though both compartments are located within the oil storage tank. Stay bolts 6 may be employed to strengthen the dividing wall 2.

A screened cover 7 may be provided for the oil reservoir 4 and serves as a rough strainer for the oil when by-passed, as will be later described. Apertured surge plates 8 are preferably disposed at spaced intervals within the oil reservoir to maintain the surge of the oil therein at a minimum.

Referring more particularly to the individual filtering elements, it will be observed that in the device of Figures 1–5 there are provided both full flow strainers 9 and filter cartridges 11, the former to remove coarser material within the oil, and the latter to remove finer material. As previously mentioned, the full flow strainers and filter cartridges are mounted in parallel so that during one cycle in a normal operation, a portion of the oil will pass through the strainer elements and the remainder through the filter cartridges. The precise form of full flow strainer and the precise form of filter cartridge may be either of the conventional type or of any special design.

Referring particularly to Figures 2 and 4, in the arrangement there disclosed I have provided three pairs of full flow strainers, each pair being supported by a casting 12 which is secured to the cover of the filter compartment, and such casting being disposed over a suitable aperture 13 provided in the cover. The casting is mounted in a fluid-tight fit upon the cover by the use of gaskets or some other suitable means, and support the full flow strainers 9 by receiving the threaded output nipple 14 of the strainer. The nipples are in fluid communication with a chamber 15 in the casting, and the oil after passing through the full flow strainers 9 enters the chamber 15.

A spring loaded valve designated generally 16 is mounted in the casting 12 and is composed of a valve body 17 provided with slots 18 which place the interior of the body in communication with the chamber 15. The valve head 19 is provided with a stem 21 and is urged against the valve seat 20 by means of spring 22. The spring 22 of course may be tensioned to afford the desired working pressure for operation of the valve. This pressure is relatively low, and, when exceeded by the pressure of the oil in chamber 15, the valve is opened and the oil from chamber 15 passes therethrough. A splash plate 23 is provided at the discharge end of the valve to direct the discharged oil downwardly. It will be observed from Figure 1 that this oil is discharged onto the screens 7.

In the event that the load on the filter cartridges builds up beyond their designed capacity, which would principally result from one or more of the cartridges being rendered inoperative by virtue of clogging, etc., I have provided for by-passing some of the oil around the full flow strainers 9. These strainers, of course, can accommodate only a certain volume of oil, and such excess passes through a valve 24. This valve consists of a head 25 seated in the casting 12, a stem 26, a spring 27 and a nut 28. The nut 28 is provided with a socket 29 in which the stem 26 may reciprocate, and also serves to hold the spring 27 operatively against the head 25. The nut 28 may be adjusted to provide the desired tension upon spring 27. When the pressure of the oil within the filter compartment 3 exceeds the predetermined amount, the valve 24 is opened, and the oil passes through channel 31, past the valve, and thence into the chamber 15 from which it is discharged through valve 16.

The filter cartridges are suitably mounted upon plates 32 which are secured over apertures provided therefor in cover 5. Discharge spouts 33 are provided on the plates 32 and are in communication with the central bore of the cartridges 11. Therefore, oil, after passing through the cartridges 11, is discharged through the spouts 33 onto the screen cover 7 of the oil compartment.

As stated above, I have disclosed full flow strainers and filter cartridges of conventional construction, in which the oil passes from the outer surface of the elements radially inwardly toward the center of the elements and thence upwardly to the castings 12, in the case of the full flow strainers, and to the plates 32 in the case of the filter cartridges. However, it will be appreciated that strainers or cartridges of different design may be used in my unit, and there may be necessary certain slight modifications for certain types of strainers and cartridges. For instance, any person skilled in the art would recognize the changes that might be necessary if strainers and cartridges were employed in which the oil was filtered by passing longitudinally through the strainers and cartridges, rather than inwardly radially as described above.

As mentioned above, my unit may be placed intermediate the scavenger and pressure pumps in a lubricating system, and the oil from the scavenger pump will enter the unit through connection 34 (connected to the line G of Figure 6) and thence pass the length of the tank through line 35. A by-pass valve 36 is positioned in line 35, and, as best shown in Figure 5, this valve may be manipulated to send all of the oil to the end of line 35, when in the position shown in Figure 5, or, if the valve is turned 90° clockwise from such position, the incoming oil will be discharged directly onto the screens 7, and thus by-pass the filtering units 9 and 11. Consequently, if it is desired to replace or repair any of the units, this valve may be operated to by-pass the oil while such replacement or repair is being made.

A pipe 37 extends from the line 35 to the base of the tank where it is connected to a manifold 38 provided with apertures 39 along its top. It will therefore be seen that the incoming oil, when not by-passed, is introduced to the filter compartment 3 adjacent its base and beneath the filter cartridges 11 and full flow strainers 9.

A pipe connection 40 (line I of Figure 6) communicates with the oil reservoir 4 near the bottom thereof for flow of oil to the pressure pump of the engine. A capped discharge nipple 41 is provided at the base of the filter compartment 3 to permit a drainage thereof if occasion requires. A cover 42 is provided for the entire tank, and may be removed when it is desired to inspect or work upon the unit.

The operation of this device is believed to be apparent from the foregoing, and consists essentially in the receipt of oil from the scavenger pump and thence the passage of such oil through lines 35 and 37 and discharge of the same through manifold 38 into the filter compartment. It will be observed that the manifold 38 provides for the relative uniform distribution of the incoming oil along the length of the filter compartment, and a portion of this oil passes through the full flow strainers 9 and the remainder through the filter cartridges 11. The proportion of oil passing through the strainers and cartridges will be determined by the setting of valves 16 and 24. To secure, as is the usual practice, a passage of the major portion of the oil through the full flow strainers, the valve 16 will be set to operate at a relatively low pressure. If it is desired to send more of the oil through the filter cartridges, the load on valve 16 may be increased which will thereby build up the pressure within the filter compartment 3 and, as a result of this, a greater quantity of oil will pass through the filter cartridge.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In an oil clarifier provided with a filtering compartment and a storage compartment, a filtering element positioned within the filtering compartment, a head upon which said element is mounted, said head being secured to one of the walls of the filtering compartment, a conduit within the head and in communication with the filtering element, a valve aperture in the head communicating with the filtering compartment at one end of the conduit, the valve of said aperture being actuatable by pressure within the filtering compartment, a valve aperture in the head at the opposite end of the conduit and communicating with the shortage compartment, the valve in said aperture being actuable by pressure within the conduit, the filtering element communicating with the conduit intermediate the two apertures.

2. In an oil clarifier provided with a filtering compartment and an oil storage compartment, an inlet communicating with the filtering compartment, an outlet communicating with the storage compartment, a cover for the filtering compartment provided with an opening therein, a strainer head positioned over said opening, a filtering element extending through the opening and supported by the head, a chamber within the head with which the filtering element communicates, an aperture at one end of the chamber and above the said opening to afford communication between the filtering compartment and the chamber, a valve for said aperture and actuatable by pressure within the filtering compartment, a hollow member extending into the chamber with its interior portion in communication therewith by means of slots in said member, a valve in said member being opened by pressure in the chamber in excess of a set maximum by pressure within said member, said member and valve being adjacent the oil storage compartment and providing for the discharge of oil from the chamber into the storage compartment.

3. In an oil clarifying device, a closed compartment adapted to hold a body of oil to be clarified, a filtering element suspended from a casting, said casting being mounted upon the top of said compartment, a conduit in the casting, a port in the casting placing the conduit in communication with the body of oil, a valve normally closing the said port but adapted to open the port when the pressure of oil in the closed compartment exceeds a predetermined value, a second port in the casting for the discharge of oil from the conduit, a valve for the second port actuatable by the pressure of oil within the conduit, said filtering element being in communication with the conduit and discharging thereto oil after its passage through the element.

WALTER C. BAUER.

REFERENCES CITED

The following references are of record in the file of this patent:

UNITED STATES PATENTS

| Number | Name | Date |
|---|---|---|
| 409,210 | Laughlin | Aug. 20, 1889 |
| 457,008 | Oster | Aug. 4, 1891 |
| 1,020,774 | Nilson | Mar. 19, 1912 |
| 1,778,596 | Heibig | Oct. 14, 1930 |
| 1,870,885 | Alsop | Aug. 9, 1932 |
| 2,041,048 | Chesny | May 19, 1936 |
| 2,230,174 | Beale | Jan. 28, 1941 |

FOREIGN PATENTS

| Number | Country | Date |
|---|---|---|
| 24,780 | Great Britain | Nov. 18, 1908 |